(12) United States Patent
Abebe et al.

(10) Patent No.: US 10,339,832 B2
(45) Date of Patent: Jul. 2, 2019

(54) KEYBOARD WITH INTEGRATED REFRESHABLE BRAILLE DISPLAY

(71) Applicant: International Business Machines Corporation, Armonk, NY (US)

(72) Inventors: Ermyas Abebe, Carlton (AU); Alessio Bonti, Carlton (AU); Adam H. E. Eberbach, Surrey Hills (AU); Peter Ilfrich, Fitzroy (AU); Nicholas I. Waywood, Melbourne (AU)

(73) Assignee: International Business Machines Corporation, Armonk, NY (US)

( * ) Notice: Subject to any disclaimer, the term of this patent is extended or adjusted under 35 U.S.C. 154(b) by 42 days.

(21) Appl. No.: 15/625,148

(22) Filed: Jun. 16, 2017

(65) Prior Publication Data

US 2018/0366030 A1 Dec. 20, 2018

(51) Int. Cl.
*G09B 21/00* (2006.01)
*G06F 3/02* (2006.01)

(52) U.S. Cl.
CPC ......... *G09B 21/004* (2013.01); *G06F 3/0219* (2013.01); *G06F 3/0227* (2013.01)

(58) Field of Classification Search
CPC .... G09B 21/004; G06F 3/0227; G06F 3/0219
USPC ........................................................ 345/168
See application file for complete search history.

(56) References Cited

U.S. PATENT DOCUMENTS

| 1,718,694 | A | * | 6/1929 | Kurowski | B41J 3/32 |
| | | | | | 235/145 R |
| 4,482,955 | A | * | 11/1984 | Amano | G06F 3/0227 |
| | | | | | 341/22 |
| 5,453,021 | A | | 9/1995 | Smith | |
| 5,685,721 | A | | 11/1997 | Decker | |
| 6,114,977 | A | * | 9/2000 | Smith | G06Q 40/12 |
| | | | | | 341/20 |
| 9,240,129 | B1 | * | 1/2016 | Niemann | G09B 21/003 |
| 2002/0042291 | A1 | * | 4/2002 | Lahteenmaki | H04M 1/0202 |
| | | | | | 455/566 |
| 2006/0280294 | A1 | * | 12/2006 | Zhang | H04M 1/72594 |
| | | | | | 379/52 |
| 2008/0020356 | A1 | * | 1/2008 | Saba | G09B 21/003 |
| | | | | | 434/113 |

(Continued)

OTHER PUBLICATIONS

Unknown; "Brailliant BI 32 (New generation) braille display"; Humanware; Printed Jun. 14, 2017; pp. 2; <http://store.humanware.com/hus/brailliant-bi-32-new-generation.html>.

(Continued)

*Primary Examiner* — Chineyere D Wills-Burns
(74) *Attorney, Agent, or Firm* — David Quinn; Hoffman Warnick LLC

(57) ABSTRACT

A hybrid keyboard and associated systems and methods. A disclosed hybrid keyboard includes a set of interactive keys, each having an integrated refreshable braille display, wherein each interactive key includes a momentary switch for detecting a keystroke and includes a actuator system for selectively extending pins through a surface of the interactive key; and a keyboard controller that includes a keystroke input handler for receiving and processing signals associated with detected keystrokes and includes a braille display handler that processes received messages and transmits message signals to selected interactive keys to output braille characters.

20 Claims, 3 Drawing Sheets

(56) References Cited

U.S. PATENT DOCUMENTS

| | | | | |
|---|---|---|---|---|
| 2008/0288638 | A1* | 11/2008 | Diab | H04L 12/2805 |
| | | | | 709/225 |
| 2011/0020771 | A1* | 1/2011 | Rea | G09B 21/02 |
| | | | | 434/114 |
| 2012/0299853 | A1* | 11/2012 | Dagar | G06F 3/016 |
| | | | | 345/173 |
| 2015/0262509 | A1* | 9/2015 | Labbe | G09B 21/004 |
| | | | | 434/113 |
| 2016/0148538 | A1* | 5/2016 | Al-Busaidi | G09B 21/02 |
| | | | | 434/114 |
| 2016/0163230 | A1* | 6/2016 | Yoon | G09B 21/025 |
| | | | | 434/114 |

OTHER PUBLICATIONS

Unknown; "WOW hands on first fullpage tactile tablet—BLITAB"; Printed Jun. 14, 2017; pp. 3; <https://www.youtube.com/watch?v=9u_ICQ5zd1Q&list=PLMnj-JIOelgfGcF6kQN3H_I1Uv6iBmt6i>.

* cited by examiner

KEYBOARD WITH INTEGRATED REFRESHABLE BRAILLE DISPLAY

TECHNICAL FIELD

The subject matter of this invention relates to keyboards for the visually impaired, and more particularly to a keyboard with a braille reader integrated therein.

BACKGROUND

The ability for blind and vision impaired people to interact with a computer is critical if they are to remain engaged in society. However, computer usage for the visually impaired gives rise to various challenges in terms of both inputting and receiving back information. Using today's technology, a visually impaired person will receive output traditionally displayed on a monitor via a screen reader, a refreshable braille display, or a combination of both. A refreshable braille display (also referred to as a braille terminal) is an electro-mechanical device for displaying braille characters, usually by means of round-tipped pins raised through holes in a flat surface. Refreshable braille displays are for example described in U.S. Pat. Nos. 5,685,721 and 5,453,021, the contents of which are hereby incorporated by reference.

Refreshable braille displays are often arranged adjacent to or below a traditional keyboard. Accordingly, when using a refreshable braille display, the user must constantly move their hands between the input source (e.g., a traditional keyboard, a Perkins Brailler, etc.) and the output source, the refreshable braille display. Unfortunately, this constant moving of hands between the devices slows down the process and can be detrimental to productivity.

SUMMARY

Aspects of the disclosure provide a hybrid keyboard having a refreshable braille display integrated into one or more keyboard keys. By placing refreshable braille characters on the physical input keys, the user can input data and simultaneously receive output simply by remaining engaged with a specialized set of interactive keys.

A first aspect discloses a hybrid keyboard, including: a set of interactive keys, each having an integrated refreshable braille display, wherein each interactive key includes a momentary switch for detecting a keystroke and includes a actuator system for selectively extending pins through a surface of the interactive key; and a keyboard controller that includes a keystroke input handler for receiving and processing signals associated with detected keystrokes and includes a braille display handler that processes received messages and transmits message signals to selected interactive keys to output braille characters.

A second aspect discloses a hybrid keyboard system, including: a hybrid keyboard having: a set of interactive keys, each having an integrated refreshable braille display, wherein each interactive key includes a momentary switch for detecting a keystroke and includes a actuator system for selectively extending pins through a surface of the interactive key; and a keyboard controller that includes a keystroke input handler for receiving and processing signals associated with detected keystrokes and includes a braille display handler that processes received messages and transmits message signals to selected interactive keys to output braille characters; and a computing system having a hybrid keyboard manager that includes: a keystroke processing system for receiving and processing keystroke data from the keyboard controller; and a braille processing system that receives and processes notifications, and forwards associated messages to the braille display handler.

A third aspect discloses a hybrid keyboard, including a set of interactive keys, each having an integrated refreshable braille display capable out outputting a selectable braille character, wherein each interactive key includes a switch for detecting a keystroke.

BRIEF DESCRIPTION OF THE DRAWINGS

These and other features of this invention will be more readily understood from the following detailed description of the various aspects of the invention taken in conjunction with the accompanying drawings in which.

Figure 1:
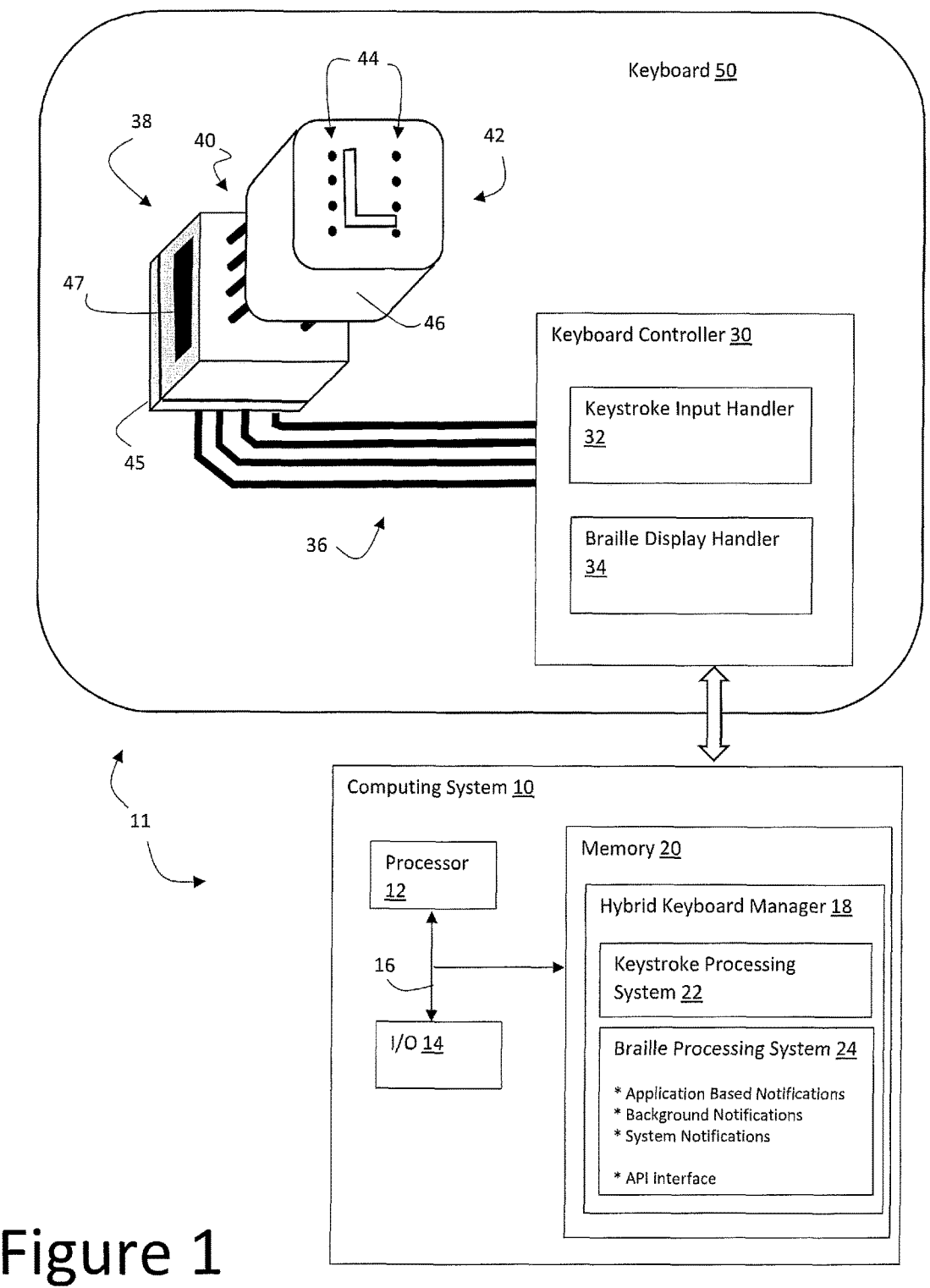
FIG. 1 shows a hybrid keyboard system according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Disclosed is a hybrid keyboard system for the visually impaired that provides user I/O (input/output) for a computing system or the like. The hybrid keyboard system may be implemented in place of any type of keyboard device, including a standard computer keyboard. As described, the hybrid keyboard system includes a refreshable braille display integrated into a set of (i.e., one or more) keyboard keys.

Referring now to the drawings, FIG. 1 depicts an operational overview of the hybrid keyboard system 11 that includes: (1) a hybrid keyboard 50 having interactive keys (single key 42 shown in a partial exploded view) and a keyboard controller 30; and (2) a hybrid keyboard manager 18 implemented with a computing system 10. Although only a single interactive key 42 is shown in FIG. 1, it is understood that hybrid keyboard 50 would generally be implemented with a plurality of keys, such those found on standard computer keyboards. Some or all of the keys may comprise interactive keys 42 some may comprise standard non-interactive keys.

In this embodiment, an interactive key for the letter "L" is shown in exploded view and includes a cap 46 and a switch mechanism 38. Switch mechanism 38 includes a conventional momentary switch 45 that detects the pressing of the key 42 by a user. Interactive key 42 differs from traditional keyboard keys in that it also includes an integrated refreshable braille display capable of outputting a braille character. To achieve this, switch mechanism 38 also includes a built-in actuator system 47 that selectively raises and lowers pins 40 through passage holes 44 to generate braille characters. Any type of actuator system may be utilized, such as a shape memory alloy actuator, a rotary cam actuator, a spring actuator, a solenoid actuator, etc. In one alternative approach, the actuator system 47 may be incorporated below the interactive key 42 in a plane with the keyboard printed circuit board (PCB) to distribute the weight. In this case, the pins may be attached to solenoids by means of flexible cables or rods inside fixed sheaths, working in the same way as mechanical bicycle gear or brake cables, or as control rods as used in model aircraft (for example Du-Bro brand "Flex Cable"). Using this approach, flexible wires can electrically connect each of the solenoids in a solenoid bundle to control electronics.

Accordingly, interactive key 42 can operate in two modes: (1) traditional keying mode in which momentary switch 45 detects a keystroke and sends a corresponding signal to the keyboard controller 30 via PCB tracks 36; and (2) braille display mode in which keyboard controller 30 sends a signal via PCB tracks 36 to actuator system 47 causing a selected set of pins 40 to be extended.

Keyboard controller 30 generally includes: a key input handler 32 that receives the keystroke signal from the interactive key 42 and forwards it to computing system 10 for further processing (e.g., entry into an word processing application, social media application, etc.); and a braille output handler 34 that receives a braille display message from the computing system 10 and forwards signals to the appropriate interactive key 42 or set of interactive keys for braille character display.

Computing system 10 may comprise any type of computing system 10 that utilizes a keyboard for data entry. For example, computing system 10 may comprise a desktop, laptop, smart device, phone, control system, input pad, calculator, Internet of Things (IoT) device, etc. Data flow to and from the keyboard controller 30 is handled by hybrid keyboard manager 18, which generally includes: (1) a keystroke processing system 22 that receives keystroke data from the keyboard controller 30 and, e.g., reformats and hands the data off to an application, operating system, etc.; and (2) a braille processing system 24 that receives notifications (e.g., via an API interface from running applications or systems), processes the notifications, and forwards corresponding messages to keyboard controller 30 for braille display.

Braille processing system 24 may for example receive application based notifications that generally involve notifications, information or feedback associated with an application the user is currently actively engaged with. For instance, if the user is working in a word processing application, notices may be generated from the application in response to a misspelled word, bad grammar, etc. In another example, if the user is entering text into a form or social media application, notices may be generated for data entry errors, such as exceeded field length, wrong format, etc. Notices may also be generated when input is correctly received, uploaded, etc., by the user. More comprehensive notices or feedback from a user application may be processed that, e.g., includes a proposed corrected spelling, a synonym, available hints, etc.

Braille processing system 24 may also receive background notifications, which generally include notices from applications or systems running in the background on computing system 10. For example, if a new email is received from an email server or a message is received from a messaging application, a notification can be issued to the braille processing system 24 and a notification message can be generated and forwarded to keyboard controller 30 for braille display. Further, actual message content could also be processed and forwarded for braille display.

Furthermore, system notifications may also be processed by braille processing system 24, which generally comprise notices from system level resources and/or external resources. For example, if low battery indication is detected on the user's laptop, the operating system can forward the warning to braille processing system 24, and a system level message can be generated and forwarded to keyboard controller 30 for braille display. Further, braille processing system 24 may receive communications from external resources (e.g., printers, modems, routers, IoT devices, etc.) via I/O 14. External communications may include notices such as "printer out of paper", "Internet down", etc. In response to an external communication, braille processing system 24 can generate and forward external notification messages to keyboard controller 30 for braille display.

Figure 2:
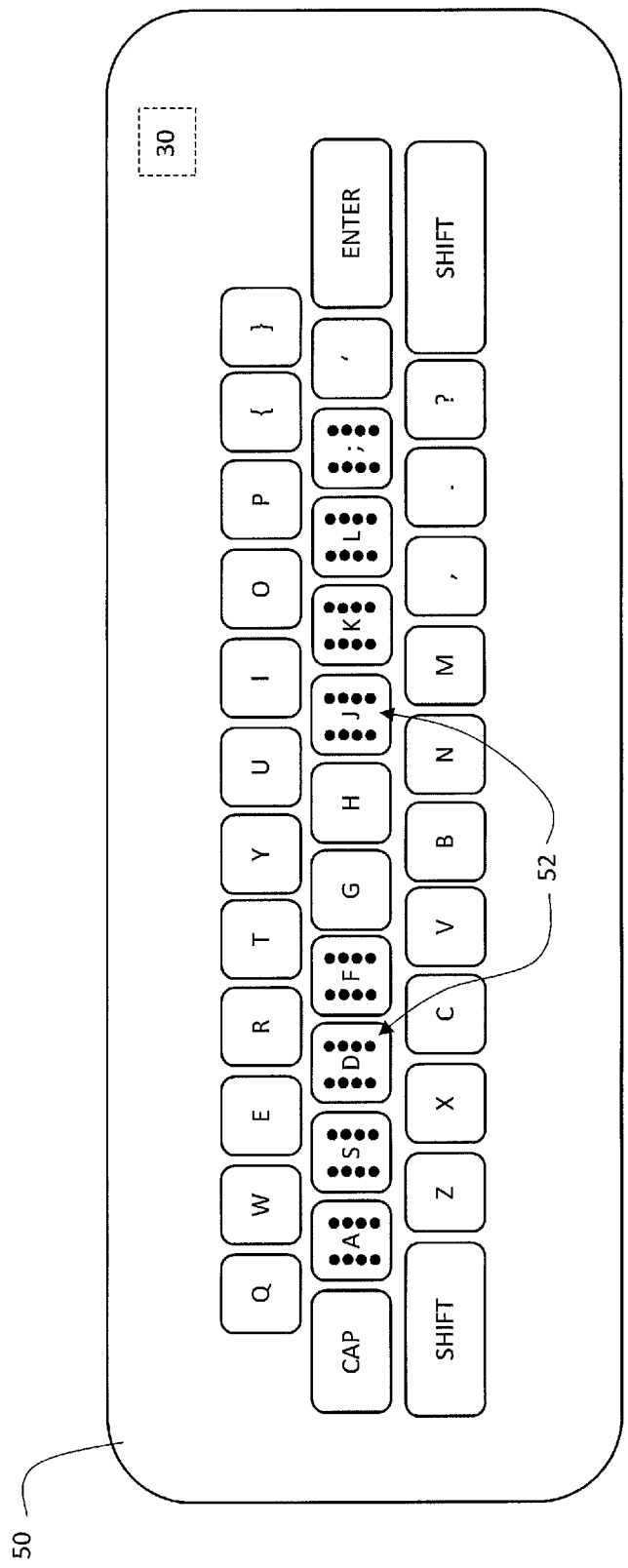
FIG. 2 shows a hybrid keyboard according to embodiments.

FIG. 2 depicts a further view of a hybrid keyboard 50 that shows a more complete set of keys in a traditional U.S. keyboard layout. In this embodiment, a subset 52 of the keys (i.e. interactive keys) include integrated refreshable braille displays. In this case, the traditional eight home keys (where a typist is taught to place their fingers) are interactive and include refreshable braille displays. In a conventional keyboard, an experienced user keeps their fingers on the home keys (i.e., for a U.S. layout, keys a, s, d, f for the left hand and j, k, l, for the right hand). By making the home keys interactive, the user can easily receive messages without having to relocate their fingers. However, it is understood that refreshable braille displays may be integrated to any or all keys on the hybrid keyboard 50.

Messages may be output in any format. For example messages may comprise simple notifications on one or more interactive keys (e.g., the braille letter M can be output on a single key to indicated a new text message was received), or more complex messaging (e.g., full sentences can be streamed using all eight interactive keys to output the content of the text message).

Figure 3:
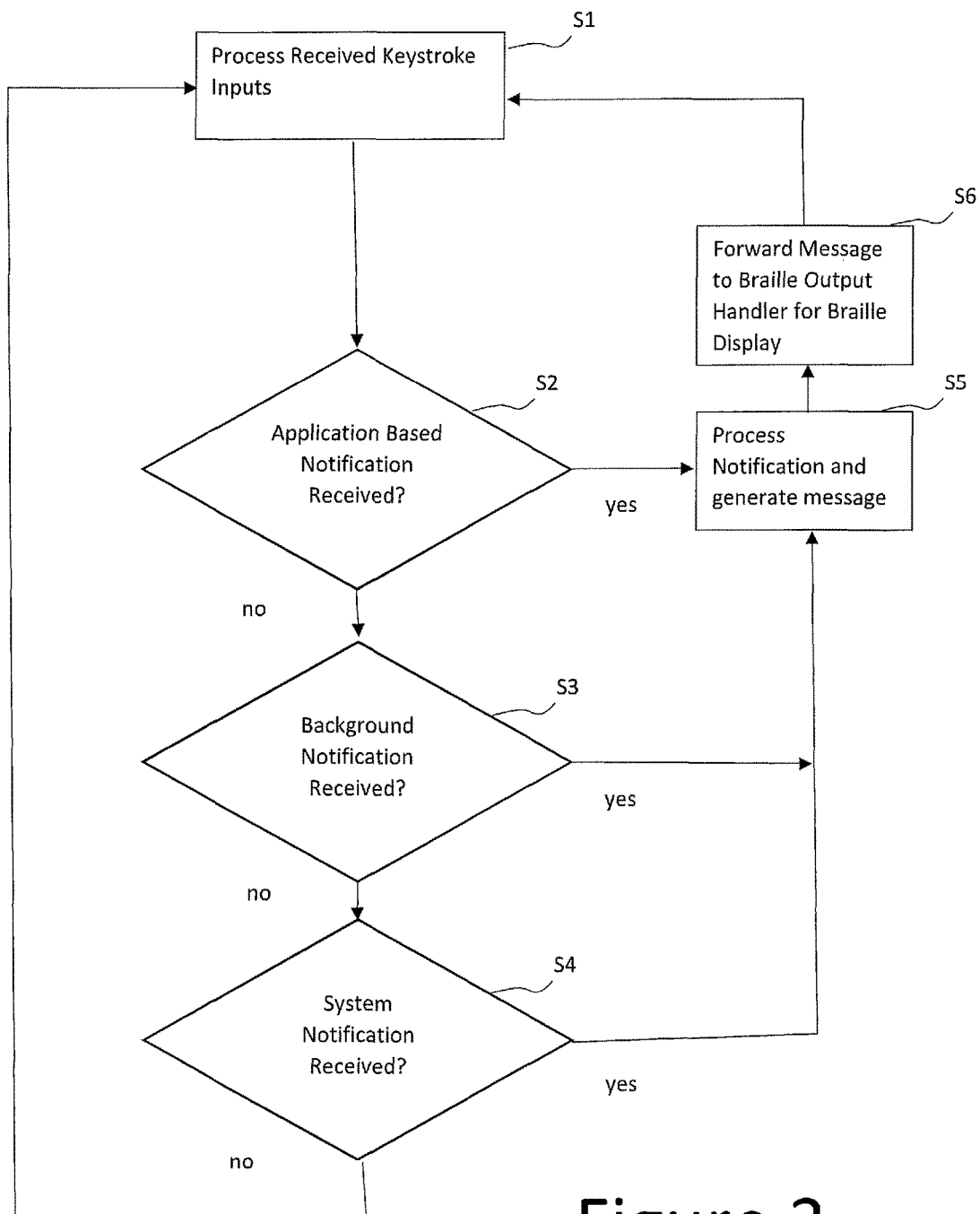
FIG. 3 shows a method of implementing the hybrid keyboard system according to embodiments.

FIG. 3 depicts a flow diagram of a method of implementing a hybrid keyboard system 11 of FIGS. 1 and 2. At S1, keystroke inputs are received and processed from hybrid keyboard 50, in a manner similar to a normal keyboard. At S2, a determination is made whether any application based notifications were received by braille processing system 24. If no, then at S3, a determination is made whether any background notifications were received by braille processing system 24. If no, then at S4, a determination is made whether any system notifications were received by braille processing system 24. If no, then control returns to S1, where received keystroke inputs are again processed. If yes is detected at S2, S3, or S4, then the notification is processed and a message is generated at S5 and is forwarded to braille output handler 34 at S6 to cause the message to be displayed on the integrated refreshable braille display.

It is understood that the hybrid keyboard manager 18 of FIG. 1 may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computing system 10 that may comprise any type of computing device and for example includes at least one processor 12, memory 20, an input/output (I/O) 14 (e.g., one or more I/O interfaces and/or devices), and a communications pathway 16. In general, processor(s) 12 execute program code which is at least partially fixed in memory 20. While executing program code, processor(s) 12 can process data, which can result in reading and/or writing transformed data from/to memory and/or I/O 14 for further processing. The pathway 16 provides a communications link between each of the components in computing system 10. I/O 14 can comprise one or more human I/O devices, which enable a user to interact with computing system 10. Computing system 10 may also be implemented in a distributed manner such that different components reside in different physical locations.

Furthermore, it is understood that the hybrid keyboard manager 18 or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A hybrid keyboard, comprising: a set of interactive keys, each capable of inputting a keyboard character and having an integrated refreshable braille display to output information, wherein each interactive key includes a momentary switch for detecting a keystroke and includes a actuator system for selectively extending pins through a surface of the interactive key; and a keyboard controller that includes a keystroke input handler for receiving and processing signals associated with detected keystrokes and includes a braille display handler that processes received messages and transmits message signals to selected interactive keys to output braille characters; wherein each of the set of interactive keys comprises of both alphanumeric characters and the braille characters, wherein the braille characters are formed by pins that selectively raises and lowers.

2. The hybrid keyboard of claim 1, wherein the hybrid keyboard includes a standard computer keyboard layout.

3. The hybrid keyboard of claim 2, wherein the set of interactive keys consists of eight home keys on the standard computer keyboard layout.

4. The hybrid keyboard of claim 1, wherein each interactive key includes a cover having a plurality of holes though which pins can be extended.

5. The hybrid keyboard of claim 1, wherein the set of interactive keys are coupled to the keyboard controller via a set of printed circuit board tracks.

6. The hybrid keyboard of claim 1, further comprising a communication channel for implementing bidirectional communications with a computing system.

7. The hybrid keyboard of claim 1, wherein the hybrid keyboard is utilized to control one of a: computer, smart device, phone, control system, input pad, calculator, or Internet of Things (IoT) device.

8. A hybrid keyboard system, comprising: a hybrid keyboard having: a set of interactive keys, each having an integrated refreshable braille display, wherein each interactive key includes a momentary switch for detecting a keystroke and includes a actuator system for selectively extending pins through a region having holes on a surface of the interactive key in which the region having holes effectuates the keystroke when pressed; and a keyboard controller that includes a keystroke input handler for receiving and processing signals associated with detected keystrokes and includes a braille display handler that processes received messages and transmits message signals to selected interactive keys to output braille characters; and a computing system having a hybrid keyboard manager that includes: a keystroke processing system for receiving and processing keystroke data from the keyboard controller; and a braille processing system that receives and processes notifications, and forwards associated messages to the braille display handler; wherein each of the set of interactive keys comprises of both alphanumeric characters and the braille characters, wherein the braille characters are formed by pins that selectively raises and lowers.

9. The hybrid keyboard system of claim 8, wherein the braille processing system includes an interface for receiving and processing application based notifications, background notifications, and system notifications.

10. The hybrid keyboard system of claim 8, wherein the hybrid keyboard includes a standard computer keyboard layout.

11. The hybrid keyboard system of claim 10, wherein the set of interactive keys consists of eight home keys on the standard computer keyboard layout.

12. The hybrid keyboard system of claim 8, wherein each interactive key includes a cover having a plurality of holes though which pins can be extended.

13. The hybrid keyboard system of claim 8, wherein the set of interactive keys are coupled to the keyboard controller via a set of printed circuit board tracks.

14. The hybrid keyboard system of claim 8, further comprising a communication channel for implementing bidirectional communications between the keyboard controller and computing system.

15. A hybrid keyboard, comprising a set of interactive keys, each having an integrated refreshable braille display capable out outputting a selectable braille character via pin holes on a surface of the interactive key, wherein each interactive key includes a switch for detecting a keystroke and wherein the pin holes are located on a region of the interactive key that results in a keystroke when pressed; wherein each of the set of interactive keys comprises of both alphanumeric characters and braille characters, wherein the braille characters are formed by pins that selectively raises and lowers.

16. The hybrid keyboard of claim 15, further comprising a keyboard controller that includes a keystroke input handler for receiving and processing signals associated with detected keystrokes and includes a braille display handler that processes received messages and transmits message signals to selected interactive keys to output braille characters.

17. The hybrid keyboard of claim 15, wherein the hybrid keyboard includes a standard computer keyboard layout.

18. The hybrid keyboard of claim 17, wherein the set of interactive keys consists of eight home keys on the standard computer keyboard layout.

19. The hybrid keyboard of claim 15, wherein each interactive key includes a cover having a plurality of holes though which pins can be extended.

20. The hybrid keyboard of claim 15, wherein the hybrid keyboard is utilized to control one of a: computer, smart device, phone, control system, input pad, calculator, or Internet of Things (IoT) device.

* * * * *